W. L. JOHNSON.
BEE FEEDER.
APPLICATION FILED AUG. 14, 1908
905,706.
Patented Dec. 1, 1908.
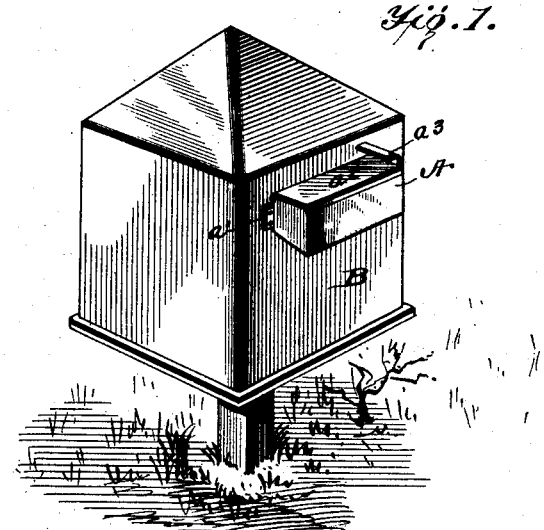
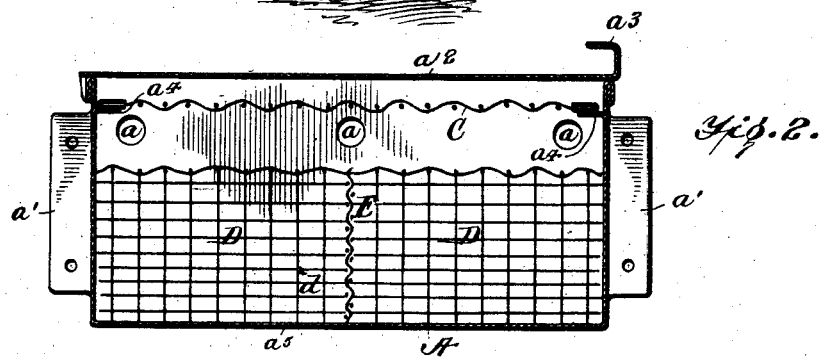
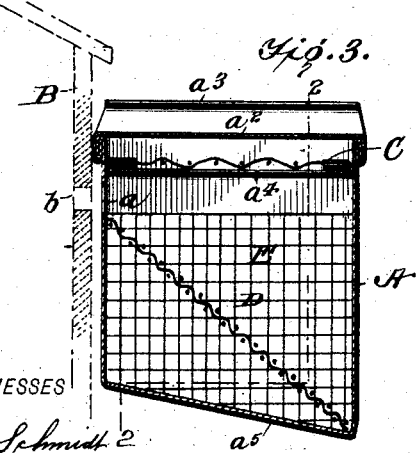
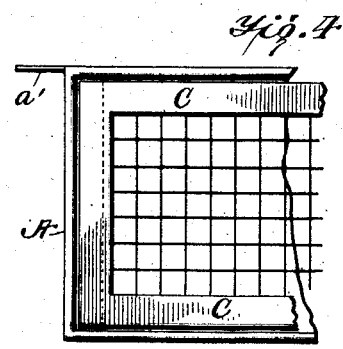
WITNESSES
INVENTOR
WILLIAM L. JOHNSON,
BY
ATTORNEYS.

UNITED STATES PATENT OFFICE.

WILLIAM LEWIS JOHNSON, OF KILLBUCK, OHIO.

BEE-FEEDER.

No. 905,706.          Specification of Letters Patent.          Patented Dec. 1, 1908.

Application filed August 14, 1908. Serial No. 448,524.

*To all whom it may concern:*

Be it known that I, WILLIAM L. JOHNSON, a citizen of the United States, residing at Killbuck, in the county of Holmes and State of Ohio, have invented an Improvement in Bee-Feeders, of which the following is a specification.

My invention is an improvement in the class of bee-feeders which are constructed and adapted to be secured to the outer sides of bee-hives, the same consisting of a small tin or other receptacle for saccharine matter and provided with openings in the side next the hive through which the bees may pass freely in order to obtain access to the feed in the receptacle.

The construction of my improved feeder is as hereinafter described, and illustrated in the accompanying drawings in which Figure 1 is a perspective view of a bee-hive with my improved bee-feeder attached. Fig. 2 is a longitudinal section of the feeder on the line 2—2 of Fig. 3. Fig. 3 is a cross section of the feeder. Fig. 4 is a plan view of a portion of the feeder with the lid or cover removed The bee-feeder A is attached to the side of a hive B, at a point near the top of the latter, and the hive is provided with a series of openings which coincide with openings $a$ in the back of the feeder. The latter is a box-like receptacle of oblong rectangular form and is preferably constructed of tin, although various other materials may be employed. It is provided at the ends adjacent to the back with vertical flanges $a'$ through which nails or screws may be inserted for securing the feeder to the back of the hive. The feeder is provided with an imperforate slidable cover $a^2$, which may be easily removed, it being constructed with an end lip or flange $a^3$ for that purpose. Directly below the lid or cover $a^2$ there is arranged a screen C which rests upon ledges $a^4$ attached to the ends of the box. This screen serves as a means for preventing escape of bees when the lid or cover $a^2$ is removed as required when saccharine matter or food is to be placed in the receptacle.

D indicates perforated screens which are arranged in the body of the feeder at an angle of about 40° and inclined from the rear side to the lower outer angle of the box, as appears in Fig. 3. The bottom being inclined downward from the back of the box or feeder, it is apparent that the feed placed in the box will gravitate to the lower portion.

E indicates a vertical transverse partition arranged between the inclined screens D and serving practically to divide the feeder into two compartments. It may be held in place by clips or lugs attached to the side walls of the feeder.

In practical use of my feeder, it forms a permanent attachment of a hive B. The holes $b$ in the latter are preferably made smaller than those ($a$) in the back of the feeder A, in order that the bees may not be injured by contact with the edges of the tin in crawling back and forth through the openings.

In order to supply the feeder, the slidable top $a^2$ is wholly or partly removed, and the feed poured in through the screen C, which at such time effectually prevents the escape of any bees, and therefore obviates all danger of the operator being stung. The feed passing through the inclined screen D strikes upon the bottom $a^5$ of the box and gravitates to the lower or deeper portion of the same. The partition E does not interfere with lateral flow of the feed. The bees entering the feeder will travel on the inclined screen D and will take up feed through it, and the more the feed is consumed and recedes, the lower will the bees travel on said screen, which thus constitutes practically a "walking board", and by which term it is generally designated.

While woven wire is preferred as the material for the construction of the screens, other material may be used for the same purpose.

It will be understood that the screens are removable so that they may be easily cleaned when required.

What I claim is:

1. The improved bee-feeder comprising a receptacle having its bottom inclined so that the feed gravitates to the lowest position, and a screen arranged at a transverse inclination within the receptacle, its lower edge resting at the lowest part of the inclined bottom as shown and described.

2. The improved bee-feeder comprising a box-like receptacle having a lid, a protecting screen arranged directly below the lid, and a second screen arranged at an inclination transversely of the receptacle, to serve as a support for bees in obtaining access to feed in the receptacle and a vertical partition dividing the space into two feeding compartments, as shown and described.

WILLIAM LEWIS JOHNSON.

Witnesses:
 F. P. PURDY,
 Z. T. PENHORWOOD.